(12) United States Patent
Grimsrud

(10) Patent No.: US 7,113,003 B2
(45) Date of Patent: Sep. 26, 2006

(54) PRESENCE INDICATION SIGNAL ASSOCIATED WITH AN ATTACHMENT

(75) Inventor: Knut S. Grimsrud, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 505 days.

(21) Appl. No.: 10/316,373

(22) Filed: Dec. 11, 2002

(65) Prior Publication Data
US 2004/0113662 A1 Jun. 17, 2004

(51) Int. Cl.
*G01R 19/00* (2006.01)
(52) U.S. Cl. .......................................... 327/18; 327/20
(58) Field of Classification Search ................ 327/509, 327/18, 20, 517
See application file for complete search history.

(56) References Cited

U.S. PATENT DOCUMENTS

| | | | | |
|---|---|---|---|---|
| 5,590,363 A | * | 12/1996 | Lunsford et al. | 712/34 |
| 5,604,873 A | * | 2/1997 | Fite et al. | 710/302 |
| 5,847,447 A | * | 12/1998 | Rozin et al. | 257/678 |
| 5,860,134 A | * | 1/1999 | Cowell | 711/172 |
| 5,892,856 A | * | 4/1999 | Cooper et al. | 382/291 |
| 5,991,885 A | * | 11/1999 | Chang et al. | 713/300 |
| 6,008,593 A | * | 12/1999 | Ribarich | 315/307 |
| 6,028,518 A | * | 2/2000 | Rankin et al. | 340/572.1 |
| 6,535,689 B1 | * | 3/2003 | Augustine et al. | 392/470 |
| 6,792,486 B1 | * | 9/2004 | Hanan et al. | 710/74 |

* cited by examiner

*Primary Examiner*—Timothy P. Callahan
*Assistant Examiner*—Cassandra Cox
(74) *Attorney, Agent, or Firm*—Buckley, Maschoff & Talwalkar LLC

(57) ABSTRACT

According to some embodiments, a presence indication associated with an attachment is provided.

17 Claims, 6 Drawing Sheets

```
┌─────────────────────────────────┐
│  DETECT THAT ATTACHMENT IS      │
│  PRESENT VIA CONDUCTIVE         │
│  PATH ADAPTED TO BE             │
│  COUPLED TO AN ATTACHMENT       │
│  AND HAVING A PURPOSE           │
│  OTHER THAN PRESENCE            │
│  DETECTION              402     │
└─────────────────────────────────┘
                │
                ▼
┌─────────────────────────────────┐
│  GENERATE PRESENCE              │
│  INDICATION SIGNAL EVEN         │
│  WHEN ATTACHMENT IS NOT         │
│  OPERATING              404     │
└─────────────────────────────────┘
```

FIG. 4

PRESENCE INDICATION SIGNAL ASSOCIATED WITH AN ATTACHMENT

BACKGROUND

In some cases, a system may need to detect whether or not an attachable device is currently present. For example, a server may need to detect whether or not one or more Redundant Array of Independent Disks (RAID) devices are present.

One way of detecting whether or not a device is present is to have the device provide a pre-defined signal sequence to the system. For example, a Serial Advanced Technology Attachment (ATA) will transmit an out-of band signal sequence to indicate its presence in accordance with the Serial ATA Working Group specification entitled "Serial ATA II: Extensions to Serial ATA 1.0" (October, 2002).

FIG. 1 illustrates a portion of a known Serial ATA interface 100 between a disk drive 102 and a system 110. In particular, this portion of the interface 100 is used to provide power to the disk drive 102 via a power supply 120. Note that three conductive paths (i.e., each associated with an interface pin) are provided between the power supply 120 and the disk drive 102 because the amount of current that can be provided through an individual interface pin is limited.

Because a Serial ATA disk drive 102 is "hot-plug" capable (i.e., the disk drive 102 can be attached or removed when power is applied to the system 110) and may include energy storing elements (e.g., capacitors), a large surge of charge-up current could briefly flow from the system 110 to the disk drive 102 when it is attached. To prevent this, one of the ATA interface pins 132 is longer than the other two pins (and will establish contact between the system 110 and the drive 102 before those pins). The conductive path associated with this interface pin 132 includes a resistor 130 having a current limiting resistance of $R_L$.

There is a disadvantage, however, with the use of a signal sequence generated by a device to detect whether or not the device is present. In particular, the system will be unable to detect that a device is present if the device is not operating. For example, a device that is malfunctioning might not be able to generate the appropriate signal sequence, or the interface might not have power applied.

As another approach, a dedicated interface pin could be used to detect whether or not a device is present. For example, a device's interface pin might always be coupled to ground. In this case, a system could detect the presence of the attachment by detecting the presence of ground via a conductive path associated with that interface pin. Requiring a dedicated interface pin, however, could increase the costs associated with an interface. Moreover, such an approach might not even be possible in the case of a pre-defined interface specification.

BRIEF DESCRIPTION OF THE DRAWINGS

FIG. 4 is a flow chart of a method according to some embodiments.

DETAILED DESCRIPTION

Some embodiments described herein detect the presence (i.e., the presence or absence) of an "attachment." As used herein, the term "attachment" may refer to any device that may or may not be present in a system, such as a storage device, a disk drive, a RAID device, or a Serial ATA device.

Figure 1:
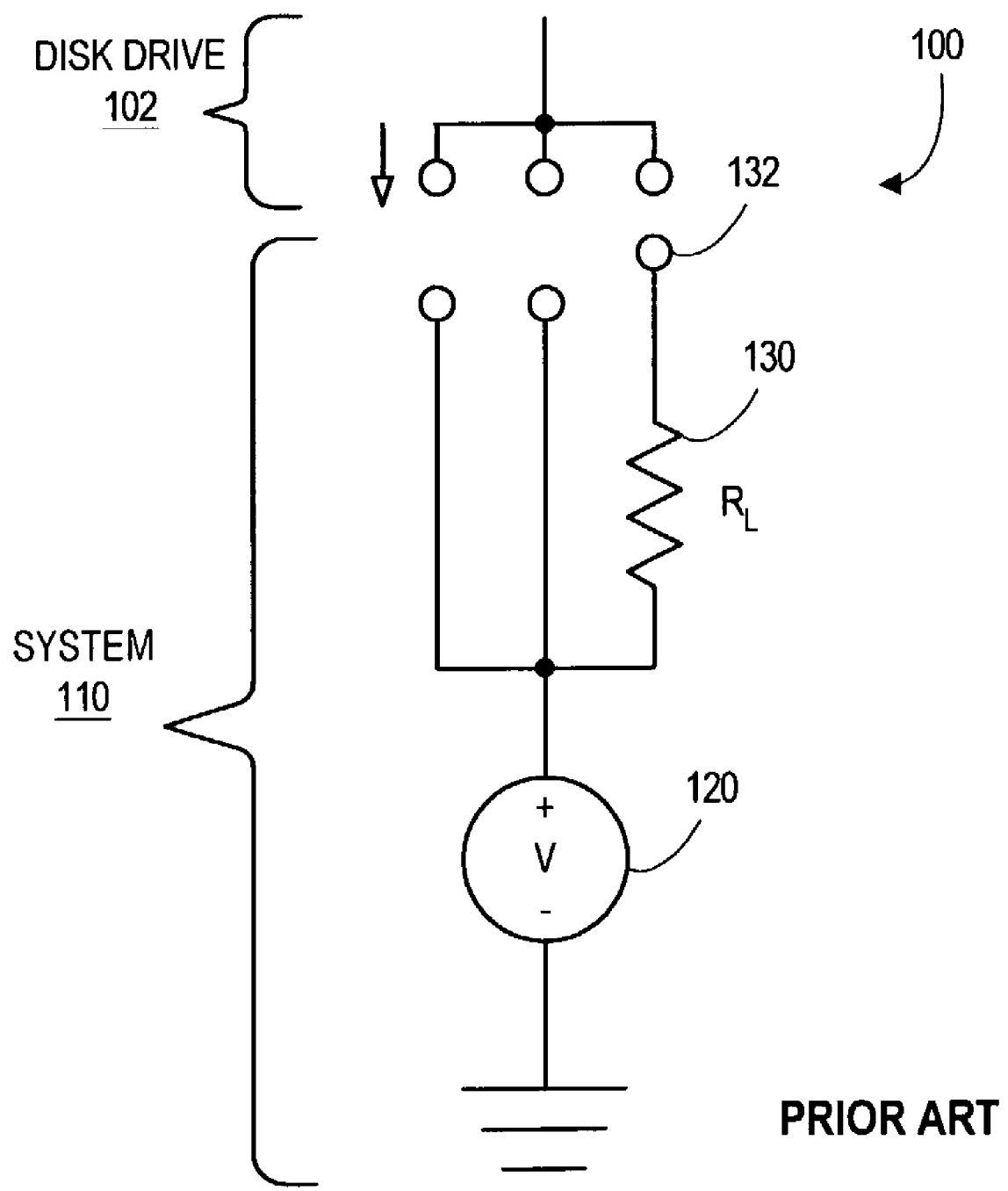
FIG. 1 illustrates a portion known Serial ATA interface.
Figure 2:
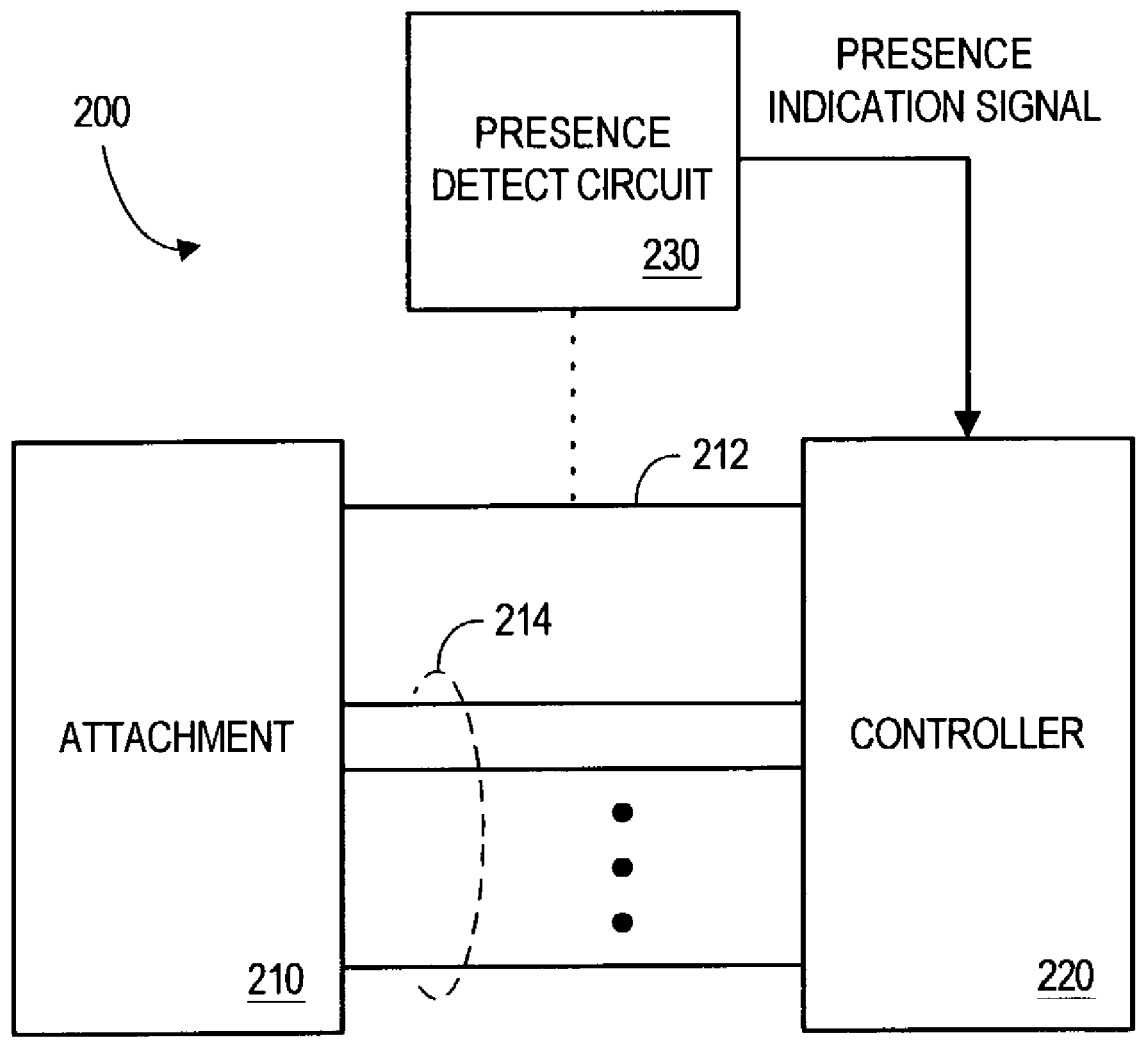
FIG. 2 is a block diagram of a system according to some embodiments.

FIG. 2 is a block diagram of a system 200 according to some embodiments. In particular, an attachment 210 may be connected to a controller 220 (e.g., a host controller) via a conductive path 212 that has a purpose other than presence detection (as well as a number of other paths 214). The conductive path 212 may be associated with, for example, an interface pin. The controller 220 may be represent, for example, a server associated with an enterprise (e.g., an organization or business).

A presence detect circuit 230 is coupled to the conductive path 212 (e.g., the presence detect circuit 230 may monitor a portion of the conductive path 212) and provides a presence indication signal to the controller 220. In particular, the presence indication signal indicates whether or not the attachment 210 is currently attached in the system 200. Moreover, according to some embodiments, the presence detect circuit 230 can generate this signal even when the attachment 210 is not operating (e.g., even when the attachment 210 is not receiving power or is malfunctioning).

Figure 3:
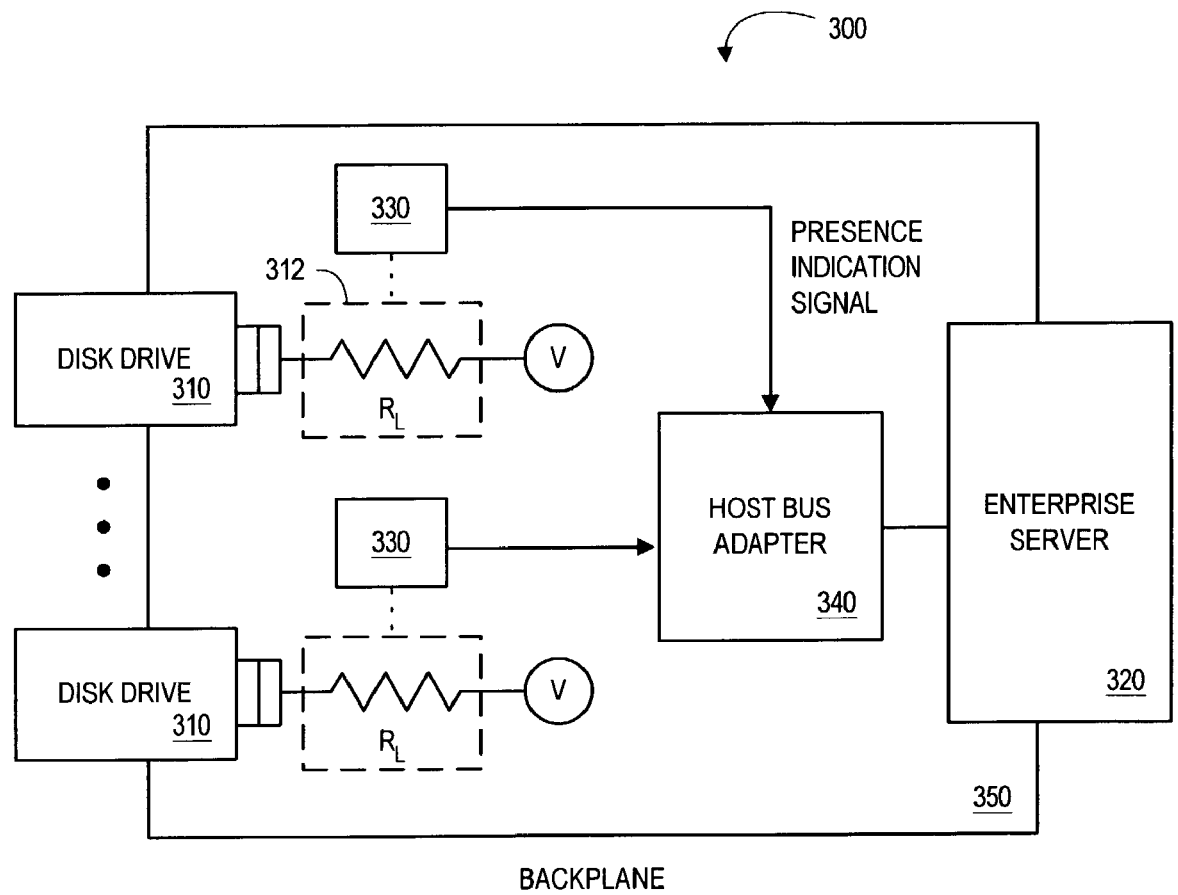
FIG. 3 is a block diagram of a system including a backplane according to some embodiments.

Although the system 200 illustrated in FIG. 2 includes an attachment 210, a controller 220, and a presence detect circuit 230, other elements may also be included. By way of example, FIG. 3 is a block diagram of a system 300 wherein a number of disk drives 310 are attached to an enterprise server 320 via a backplane 350. The system 300 may be associated with, for example, a rack of RAID disk drives 310 (e.g., up to fifteen disk drives 310 might be mounted to the backplane 350).

The backplane 350 may comprise, for example, a storage device rack and/or an electronic circuit board containing circuitry and receptacles (e.g., connectors or sockets) that may be used to attach the disk drives 310 (e.g., via a Serial ATA interface). According to other embodiments, the backplane 350 is associated with a motherboard or Input Output (IO) controller.

Each disk drive 310 is connected to the backplane 350 via a conductive path 312 that has a purpose other than presence detection (as well as a number of other paths not shown in FIG. 3). In this case, the conductive path 312 is associated with an interface pin that provides power to the disk drive 310 via a power supply V. Moreover, the conductive path 312 performs a pre-charge function for the disk drive 310 via a limiting resistance $R_L$.

A presence detect circuit 330 is coupled to each conductive path 312 (e.g., the presence detect circuit 330 may monitor a portion of the conductive path 312) and provides a presence indication signal to a host bus adaptor 340. The presence detect circuit 330 might, for example, include a discriminator that measures an impedance associated with the conductive path 312.

The host bust adaptor 340 may be, for example, a management device such as a System Management Bus (SM-BUS) or an Inter-Integrated Circuit (I2C) agent that is responsible for communication with various devices in an enclosure (e.g., fans, lights, and power supplies).

The set of presence indication signals received by the host bus adaptor 340 indicate whether or not a disk drive 310 is currently attached to each receptacle. Moreover, according to some embodiments, the presence detect circuit 330 can generate the presence indication signal even when a disk drive 310 is not operating (e.g., even when the disk drive 310 is not receiving power or is malfunctioning). The host bus adaptor 340 may then provide information associated with the disk drives 310 to the enterprise server 320.

Method

Refer now to FIG. 4, which is a flow chart of a method according to some embodiments. The flow chart does not imply a fixed order to the actions, and embodiments may be practiced in any order that is practicable. The method may be associated with, for example, the presence detect circuits 230, 330 described with respect to FIGS. 2 and 3.

At 402, the presence of an attachment is detected via a conductive path that is adapted to be coupled to an attachment. The attachment may comprise, for example, storage device and the conductive path may be associated with a Serial ATA interface pin. According to some embodiments, conductive path has a purpose other than presence detection. For example, the other purpose might be to deliver power to the attachment or to perform a pre-charge function for the attachment.

At 404, a presence indication signal is generated. According to some embodiments, the presence indication signal is generated even when the attachment is not operating. For example, the presence indication signal might indicate to a host controller that a storage device is (or is not) currently present with respect to a particular Serial ATA interface (e.g., receptacle).

Note that it could instead (or subsequently) be detected via the conductive path that an attachment is not present. In this case, the presence indication signal is adjusted as appropriate.

Circuit Examples

Figure 5:
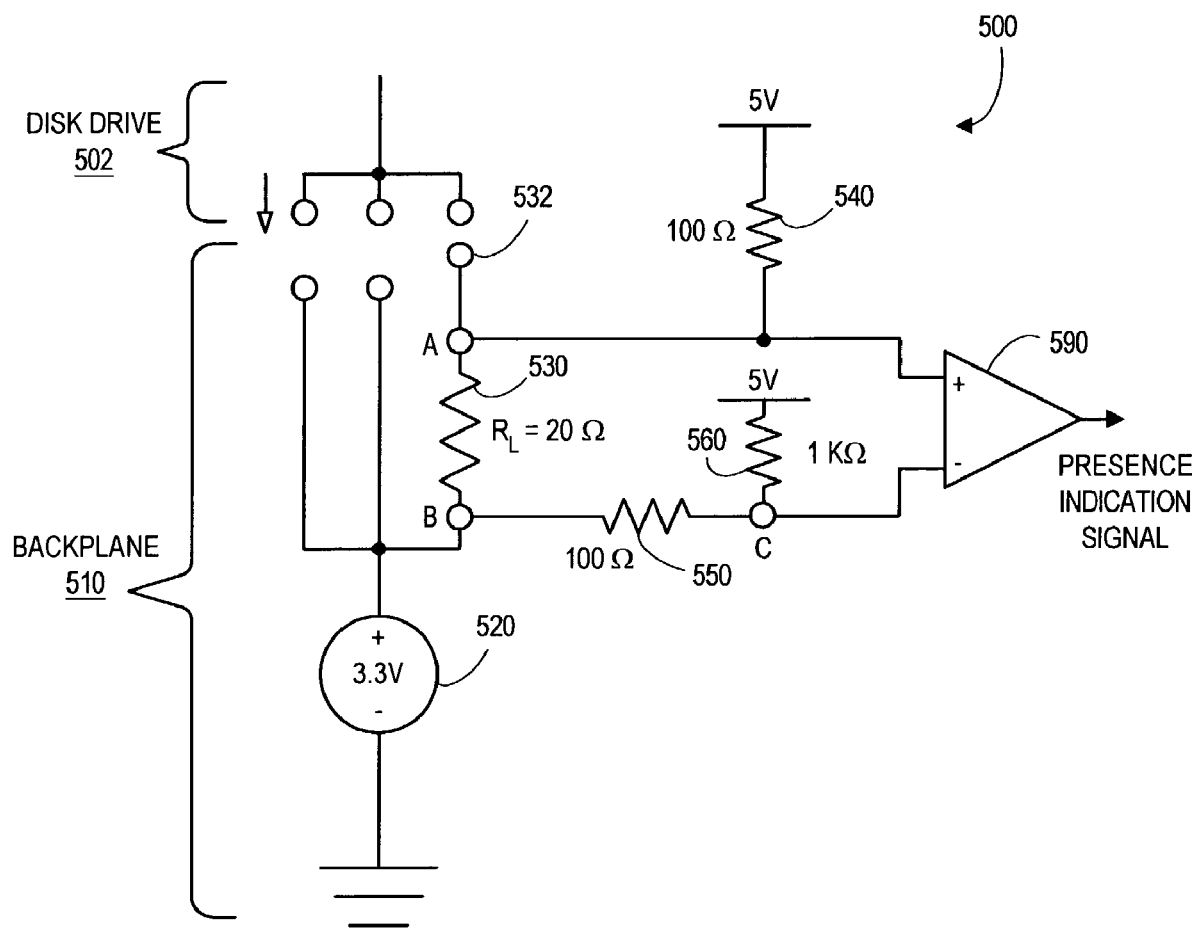
FIG. 5 is a circuit that generates a presence indication signal according to some embodiments.

FIG. 5 is a circuit 500 that generates a presence indication signal according to some embodiments. As illustrated in FIG. 5, the circuit 500 includes a portion of an interface between a disk drive 502 and a backplane 510. In particular, the portion of the interface comprises three conductive paths (e.g., associated with three interface pins) that may be used to supply power from a 3.3 Volt (V) power supply 520 to the disk drive 502. Note that the three conductive paths illustrated in FIG. 5 might comprise only one of a number of different sets of interface pins, with each set being used to provide different voltages to the disk drive 502 (e.g., one set of three interface pins might provide 3.3V while another set provides 5V). In this case, a presence indication signal might be generated based on information associated with a single interface pin.

As with a Serial ATA interface, one of the conductive paths 532 is associated with a resistor 530 having a limiting resistance of $R_L$. In this case, $R_L$ is 20 ohms ($\Omega$). Note that the other two conductive paths are associated with a resistance of substantially zero. Moreover, the disk drive 502 will short together all three conductive paths when attached to the backplane 510.

According to this embodiment, the conductive path 532 includes: (i) a node A between $R_L$ and the disk drive 502, and (ii) a node B between $R_L$ and the power supply 520. In addition, a comparator 590 has an output line to provide a presence indication signal, a first input line coupled to node A, and a second input line coupled to a node C.

One voltage pull-up resistor 540 (100 $\Omega$) is coupled from node A to 5V, and another voltage pull-up resistor 560 (1 K$\Omega$) is coupled from node C to 5V. Finally, a resistor 550 (100 $\Omega$) is coupled between nodes B and C.

Note that nodes A and B are directly shorted together when the disk drive 502 is attached to the backplane 510. Also note that the voltage pull-up resistor 540 will drift-up a voltage level at node A a first amount when the conductive path 532 is not shorted to the other conductive paths (i.e., the disk drive 502 is not attached to the backplane 510). For the circuit 500 illustrated in FIG. 5, the voltage at node A ($V_A$) will drift-up from 3.3V to:

$$V_A = 3.3\ V + (5\ V - 3.3\ V) * \frac{20\Omega}{(100\Omega + 20\Omega)} = 3.58\ V$$

Similarly, the voltage pull-up resistor 540 will not drift-up the voltage level at node A when the conductive path 532 is shorted to the other conductive paths (i.e., the disk drive 502 is attached to the backplane 510). That is, node A is directly coupled to the power supply 520 and the voltage level will remain at 3.3V.

Whether or not the conductive path 532 is shorted to the other conductive paths (i.e., whether or not the disk drive 502 is attached to the backplane 510), the voltage pull-up resistor 560 will drift-up a voltage level at node C a second amount, the second amount being less than the first amount. For the circuit 500 illustrated in FIG. 5, the voltage at node C ($V_C$) will remain at:

$$V_c = 3.3\ V + (5\ V - 3.3\ V) * \frac{100\Omega}{(100\Omega + 1000\Omega)} = 3.45\ V$$

Thus, when the disk drive 502 is not present, $V_A$ will be greater than $V_C$ (i.e., 3.58V is greater than 3.45V) and the comparator 590 will be in a first state associated with the presence indication signal. When the disk drive 502 is present, on the other hand, $V_A$ will be less than $V_C$ (i.e., 3.3V is less than 3.45V) and the comparator 590 will be in a second state associated with the presence indication signal.

Note that the circuit 500 illustrated in FIG. 5 requires two separate lines (e.g., wires) between the presence detect portion and the interface portion (i.e., the interface between the disk drive 502 and the backplane 510). Moreover, generation of the presence indication signal might depend on power from the power supply 520. In some systems, however, power from the power supply 520 can be removed (e.g., power to a receptacle might be removed by an operator when servicing a disk drive 502).

Figure 6:
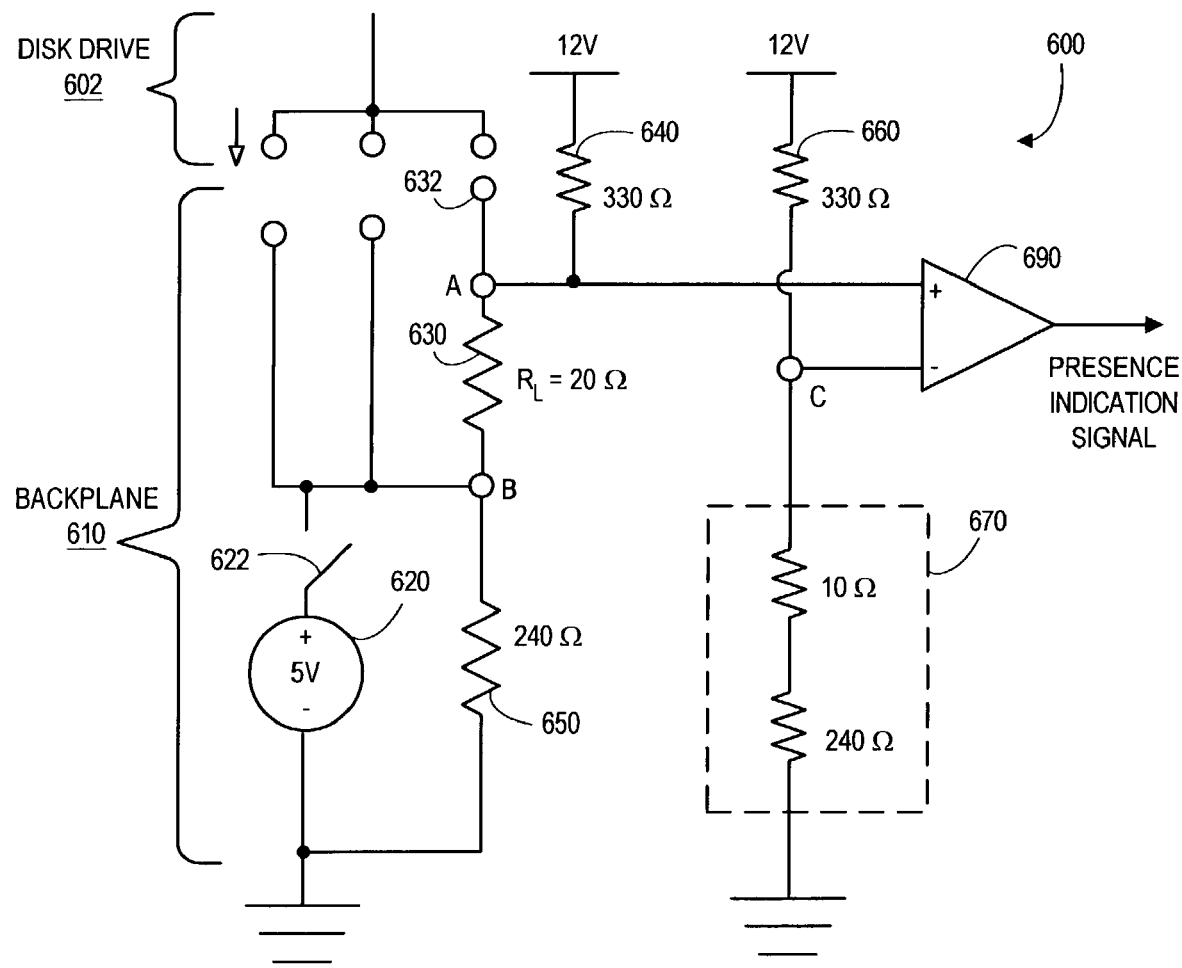
FIG. 6 is a circuit that generates a presence indication signal according to some other embodiments.

To address these issues, FIG. 6 is a circuit 600 that generates a presence indication signal according to some other embodiments. As before, the circuit 600 includes a portion of an interface between a disk drive 602 and a backplane 610. The portion comprises three conductive paths (e.g., associated with three interface pins) that may be used to supply power from a 5V power supply 620 to the disk drive 602. Note that a switch 622 may be used to provide or remove power from the power supply 620.

As with a Serial ATA interface, one of the conductive paths 632 is associated with a resistor 630 having a limiting resistance of $R_L$ (20 $\Omega$) and the other two conductive paths are associated with a resistance of substantially zero. Moreover, the disk drive 602 will short together all three conductive paths when attached to the backplane 610.

According to this embodiment, the conductive path 632 includes: (i) a node A between $R_L$ and the disk drive 602, and (ii) a node B between $R_L$ and the switch 622. In addition, a comparator 690 has an output line to provide a presence indication signal, a first input line coupled to node A, and a second input line coupled to a node C.

One voltage pull-up resistor 640 (330 Ω) is coupled from node A to 12V, and another voltage pull-up resistor 660 (330 Ω) is coupled from node C to 12V. Moreover, one voltage pull-down resistor 650 (240 Ω) is coupled from node B to ground, and another voltage pull-down resistor 670 (10 Ω+240 Ω=250 Ω) is coupled from node C to ground. Note that the pull-down resistor 670 has a value substantially equal to the value of the pull-down resistor 650 plus half of $R_L$.

Consider first the case where the disk drive 602 is attached to the backplane 610 and power is being supplied by the power supply 620. Because the disk drive 602 is shorting node A to node B, node A ($V_A$) is directly coupled to the power supply 620 and the voltage level will simply equal 5V. Moreover, the voltage at node C ($V_C$) will equal:

$$V_c = 12\ V * \frac{(10\Omega + 240\Omega)}{(330\Omega + 10\Omega + 240\Omega)} = 5.17\ V$$

Thus, $V_A$ will be less than $V_C$ (i.e., 5V is less than 5.17V) and the comparator 690 will be in a first state associated with the presence indication signal. Note that $V_C$ will always equal 5.17V (whether or not the disk drive 602 is present and whether or not the power supply 620 is supplying power via the switch 622).

Now consider the case where power from the power supply 620 is removed (but the disk drive 602 is still attached to the backplane 610). In this case, node A is shorted to node B, and $V_A$ will equal:

$$V_A = 12\ V * \frac{240\Omega}{(330\Omega + 240\Omega)} = 5.05\ V$$

Thus, $V_A$ will still be less than $V_C$ (i.e., 5.05V is less than 5.17V) and the comparator 690 will remain in the first state associated with the presence indication signal. Note that if the disk drive 602 actually provides a finite impedance to ground, $V_A$ might be even less than 5.05V.

Consider now the case where the disk drive 602 is not attached to the backplane 610 and power is being supplied by the power supply 620. In this case, node A is not shorted to node B (which will be at 5V) and $V_A$ will equal:

$$V_A = 5\ V + (12\ V - 5\ V) * \frac{20\Omega}{(330\Omega + 20\Omega)} = 5.4\ V$$

Now, $V_A$ will be greater than $V_C$ (i.e., 5.4V is greater than 5.17V) and the comparator 690 will be in a second state associated with the presence indication signal.

Finally, when the disk drive 602 is not attached to the backplane 610 and power is not being supplied by the power supply 620, $V_A$ will equal:

$$V_A = 12\ V * \frac{(240\Omega + 20\Omega)}{(330\Omega + 20\Omega + 240\Omega)} = 5.29\ V$$

Thus, $V_A$ is be greater than $V_C$ (i.e., 5.29V is greater than 5.17V) and the comparator 690 remains in the second state associated with the presence indication signal.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although particular circuits have been described herein, other circuits may instead be used to generate a presence indication signal (e.g., using other voltages and resistors). Moreover, some examples have been associated with a first conductive path having a limiting resistance and a second conductive path having a resistance of substantially zero. According to other embodiments, however, the second conductive path may instead be associated with another resistance (e.g., another resistance other than the limiting resistance). Similarly, some examples have been associated with a portion of an interface having three conductive paths. According to other embodiments, the interface may instead comprise a different number of conductive paths.

The several embodiments described herein are solely for the purpose of illustration. Persons skilled in the art will recognize from this description other embodiments may be practiced with modifications and alterations limited only by the claims.

What is claimed is:

1. An apparatus, comprising:
   an interface to facilitate an exchange of information with an attachment, including a conductive path associated with a limiting resistance, wherein the conductive path is to be coupled to, deliver power to, and perform a pre-charge function for the attachment; and
   a presence detect circuit coupled to the conductive path, wherein the presence detect circuit is to generate a presence indication signal even when the attachment is not operating.

2. The apparatus of claim 1, wherein the attachment is associated with at least one of: (i) a storage device, (ii) a disk drive, (iii) a redundant array of independent disks device, and (iv) a serial advanced technology attachment device.

3. The apparatus of claim 1, wherein the conductive path is associated with at least one of: (i) a pin, and (ii) a serial advanced technology attachment interface.

4. The apparatus of claim 1, wherein the apparatus is associated with at least one of: (i) a receptacle, (ii) a connector, (iii) a backplane, (iv) a storage device rack, (v) a management device, and (vi) an enterprise server.

5. The apparatus of claim 1, wherein the presence indication signal is associated with at least one of: (i) a host controller, (ii) a host bus adapter, (iii) a management device, and (iv) an enterprise server.

6. The apparatus of claim 1, wherein the conductive path is a first conductive path and the apparatus further comprises:
   a second conductive path to be coupled to the attachment, wherein the second conductive path is associated with a resistance other than the limiting resistance.

7. The apparatus of claim 6, wherein the second conductive path is associated with a resistance of substantially zero.

8. The apparatus of claim 7, wherein the presence detect circuit includes:
- a first node between the limiting resistance and a portion of the conductive path to be coupled to the attachment, wherein the first node is to be substantially shorted to the second conductive path when the attachment is present;
- a second node between the limiting resistance and a power supply;
- a comparator, comprising:
  - an output line to provide the presence indication signal,
  - a first input line coupled to the first node, and
  - a second input line coupled to a third node;
- a first node voltage pull-up resistor coupled to the first node;
- a third node voltage pull-up resistor coupled to the third node; and
- a resistor coupled between the second node and the third node,
- wherein the first node voltage pull-up resistor is adapted to: (i) drift-up a voltage level at the first node a first amount when the conductive path is not coupled to the attachment, and (ii) not drift-up the voltage level at the first node when the conductive path is coupled to the attachment, and
- wherein the third node voltage pull-up resistor is adapted to drift-up a voltage level at the third node a second amount, the second amount being less than the first amount.

9. The apparatus of claim 7, wherein the presence detect circuit includes:
- a first node between the limiting resistance and a portion of the conductive path to be coupled to the attachment, wherein the first node is to be substantially shorted to the second conductive path when the attachment is present; and
- a second node between the limiting resistance and a power supply,
- wherein the presence detect circuit is adapted to generate the presence indication signal even when the power supply is off.

10. The apparatus of claim 9, wherein the presence detect circuit further comprises:
- a comparator, comprising:
  - an output line to provide the presence indication signal,
  - a first input line coupled to the first node, and
  - a second input line coupled to a third node;
- a first node voltage pull-up resistor coupled to the first node;
- a second node voltage pull-down resistor coupled to the second node;
- a third node voltage pull-up resistor coupled to the third node; and
- a third node voltage pull-down resistor coupled to the third node, wherein the third node pull-down resistor has a value substantially equal to the value of the first voltage pull-down resistor plus half of the limiting resistance.

11. An apparatus, comprising:
- a first conductive path having a limiting resistance and adapted to be coupled to a storage device in order to deliver power and to perform a pre-charge function for the storage device;
- a second conductive path to be coupled to the storage device, wherein the second conductive path is associated with a resistance of substantially zero; and
- a presence detect circuit coupled to the conductive path, wherein the presence detect circuit comprises:
  - a first node between the limiting resistance and a portion of the conductive path to be coupled to the storage device,
  - a second node between the limiting resistance and a power supply,
  - a comparator, comprising:
    - an output line to provide a presence indication signal to a host controller, the presence indication signal indicating whether or not the first and second conductive paths are coupled to the storage device,
    - a first input line coupled to the first node, and
    - a second input line coupled to a third node,
  - a first node voltage pull-up resistor coupled to the first node,
  - a second node voltage pull-down resistor coupled to the second node,
  - a third node voltage pull-up resistor coupled to the third node, and
  - a third node voltage pull-down resistor coupled to the third node,
- wherein the presence detect circuit is adapted to generate the presence indication signal even when the power supply is off.

12. The apparatus of claim 11, wherein the first and second conductive paths are associated with a serial advanced technology attachment interface.

13. A method, comprising:
- exchanging information with an attachment via a conductive path;
- detecting that the attachment is present via a conductive path adapted to be coupled to, and perform a pre-charge function for, the attachment;
- generating a presence indication signal even when the attachment is not operating;
- detecting that the attachment is not present via the conductive path; and
- adjusting the presence indication signal.

14. The method of claim 13, wherein the attachment is associated with at least one of: (i) a storage device, (ii) a disk drive, (iii) a redundant array of independent disks device, and (iv) a serial advanced technology attachment device.

15. The method of claim 13, wherein the conductive path is associated with at least one of: (i) a pin, and (ii) a serial advanced technology attachment interface.

16. The method of claim 13, wherein the presence indication signal is associated with at least one of: (i) a host controller, (ii) a host bus adapter, (iii) a management device, and (iv) an enterprise server.

17. The method of claim 13, wherein the conductive path is further to deliver power to the attachment.

* * * * *